Figure 1:
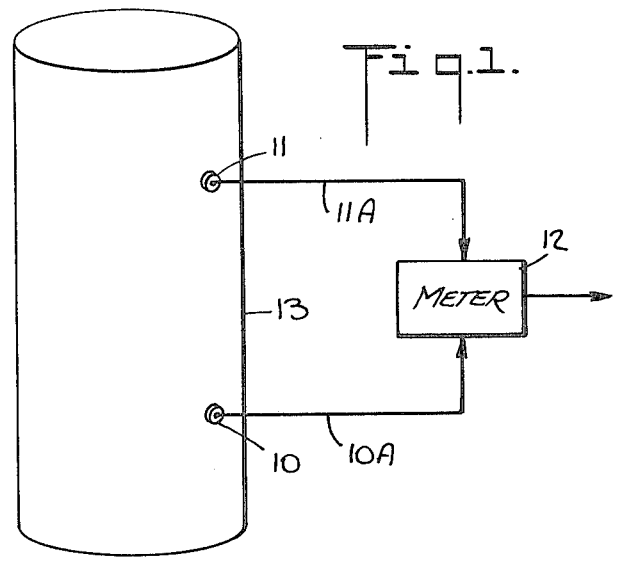

United States Patent [19]

Siegel

[11] 3,999,435
[45] Dec. 28, 1976

[54] DIFFERENTIAL PRESSURE TRANSMITTER

[75] Inventor: William A. Siegel, Norristown, Pa.

[73] Assignee: Fischer & Porter Co., Warminster, Pa.

[22] Filed: Jan. 9, 1976

[21] Appl. No.: 647,811

Related U.S. Application Data

[63] Continuation-in-part of Ser. No. 571,311, April 24, 1975.

[52] U.S. Cl. .................................. 73/393; 73/407 R
[51] Int. Cl.² ...................... G01L 19/04; G01L 7/08
[58] Field of Search ................. 73/393, 406, 407 R, 73/205 R, 395

[56] References Cited

UNITED STATES PATENTS

| | | | |
|---|---|---|---|
| 2,037,949 | 4/1936 | Tate | 73/393 |
| 3,411,363 | 11/1968 | Danvic et al. | 73/393 |
| 3,656,348 | 4/1972 | Bertrand | 73/407 R |
| 3,851,530 | 12/1974 | Symonds et al. | 73/395 |

*Primary Examiner*—Donald O. Woodiel

[57] ABSTRACT

A differential-pressure transmitter adapted to produce a signal proportional to a process variable such as flow rate in a line conducting fluid or the level of liquid in a tank, the process fluid being at a temperature markedly at variance with ambient temperature. The transmitter is constituted by high and low pressure sensors which are coupled to the force beam of a force balance transducer so that the beam is responsive to the difference between sensed high and low pressures derived from the process variable, the transducer being exposed to ambient temperature. Each sensor is constituted by a housing having a well therein covered by a sensing diaphragm and an insert seated in the well, the face of the insert being spaced from the diaphragm to define a fill chamber containing hydraulic fluid, the sensor diaphragm being exposed to the process liquid, whereby heat transfer takes place between the liquid and the hydraulic fluid. The insert is formed of a metal having a low coefficient of expansion relative to the material of the housing whereby variations in temperature produce changes in the dimensions of the housing relative to that of the insert and give rise to changes in the volume of the fill chamber to an extent compensating for the concurrent changes in the volume of hydraulic fluid as a result of said heat transfer, thereby rendering the sensor insensitive to temperature changes.

4 Claims, 3 Drawing Figures

DIFFERENTIAL PRESSURE TRANSMITTER

RELATED APPLICATION

This application is a continuation-in-part of my co-pending application Ser. No. 571,311, filed Apr. 24, 1975, entitled "Temperature-Compensated Liquid Level Transmitter".

BACKGROUND OF INVENTION

This invention relates generally to differential-pressure transmitters adapted to produce a signal proportional to a process variable, and more particularly to a transmitter whose differential-pressure sensors are insensitive to the temperature of the process fluid.

A differential-pressure transmitter is used to measure various process variables, such as fluid flow rate, liquid level and density. Such transmitters are widely used in industrial process systems to produce an output signal suitable for transmission to a remote station for operating indicator or control mechanisms. While the present invention will mainly be described in connection with the measurement of liquid level, it is to be understood that it is also applicable to the measurement of other process variables such as flow rate.

Liquid level transmitters are known which operate on the force-balance principle, the transmitter being directly bolted onto the tank containing the liquid. The fluid level in either an open tank or a closed tank under pressure or vacuum is detected by a differential-pressure capsule assembly which senses the difference between the weight of the liquid (level) on both sides of the capsule, and converts it into a force that is transmitted by a connecting rod to the lower extremity of a force beam.

In existing types of liquid level transmitters, the differential capsule assembly includes a pair of coupled diaphragms which define a fill space containing a hydraulic fluid that provides a non-compressible back up under high static pressures. The outer diaphragm is exposed to the liquid in the tank, whereas the inner diaphragm is exposed to atmospheric or relatively low pressures. The coupled diaphragms are linked to the lower extremity of the force beam by a connecting rod passing through a support tube which joins the housing of the capsule assembly with the body of the force balance meter, the support tube defining the low pressure process chamber.

Thus the force on the diaphragms in response to the difference in pressure is transferred by the rod to the beam to deflect the beam accordingly. The force mechanically applied to the beam is converted by the force balance transducer into a signal proportional thereto. Such mechanical coupling between the differential capsule assembly and the force beam gives rise to a serious source of error.

The metal connecting rod extending between the diaphragms and the force beam is disposed within the low pressure process chamber defined by the metal support tube joining the housing of the capsule assembly to the meter body. The temperature of this rod is often at a temperature which is distinctly at variance with the temperature of the support tube. The reason for this is that the support tube responds not only to the process temperature to which the rod is also exposed, but to ambient temperatures as well. When, therefore, the rod and the support tube are subjected to different temperatures, the mechanical coupling between the diaphragms and the force beam will change length due to the coefficient of expansion of the metals. This change in length, multiplied by the system gradient, generates a force which, when compared to the full scale operating force, will determine the magnitude of temperature error.

In order to minimize the influence of temperature on the coupling in a liquid level transmitter between the level sensor and the meter body, it is known to replace the mechanical coupling with a hydraulic coupling in the form of a flexible capillary tube extending between the fill space in the sensor assembly and a measuring diaphragm in the meter, this diaphragm being linked to the force beam. With a hydraulic coupling of this type, changes in the length of the capillary relative to that of the support tube have virtually no effect on the performance of the coupling. But should the process heat up the fill between the diaphragms of the differential assembly, the resultant expansion in the fill will generate a pressure proportional to the fluid volume and inversely proportional to the diaphragm compliance, thereby simulating a change in liquid level and producing a spurious signal.

In the above-identified copending application, there is disclosed a liquid level transmitter having a sensor including a hydraulic fill chamber whose physical dimensions are varied as a function of temperature to alter the internal volume of the chamber in proportion to changes in fill pressure occurring by reason of changes in fill temperature, thereby rendering the sensor insensitive to temperature variations.

In the sensor disclosed in the copending application, the fill chamber is defined by a sensing diaphragm which is exposed to liquid in the tank and an insert incorporated in the sensor housing and spaced from the diaphragm. The sensor housing is joined by a support tube to the body of a meter whose pivoted beam is mechanically linked to a measuring diaphragm disposed in a diaphragm chamber. The fill chamber of the sensor communicates with the diaphragm chamber of the meter body by way of a capillary extending through the coupling tube. The fill chamber, the capillary and the diaphragm chamber contain hydraulic fluid, whereby the pressure of tank liquid imposed on the diaphragm of the sensor is transmitted hydraulically to the measuring diaphragm to apply a torque to the force beam. In order to compensate for the effect of temperature on the volume of the fill in the fill chamber of the sensor, the insert is formed of a metal having a low coefficient of expansion relative to that of the sensor housing, whereby the volume of the fill chamber varies in proportion to changes in the volume of the fill.

In the liquid level transmitter disclosed in the above-identified copending application, the body of the force-balance transducer or meter is coupled to the temperature-compensated high pressure sensor through a capillary extending through a short rigid support tube, whereas the low pressure sensor is incorporated in the body of the meter and is not temperature-compensated.

Where the liquid in the tank whose liquid level is being measured is at an exceptionally high temperature (i.e., 600° F) or at any exceptionally low temperature (i.e., −40° F), the transmitter arrangement disclosed in the copending application is not suitable, in that the meter, because of its close proximity to the tank, is affected by the temperature of the liquid. Because the low pressure sensor in the body of the meter is no longer at normal atmospheric temperature and lacks temperature compensation, the resulting liquid level reading is inaccurate.

SUMMARY OF INVENTION

In view of the foregoing, the main object of this invention is to provide a differential-pressure transmitter capable of producing an output signal that is proportional to a process variable, the signal being independent of changes in the temperature of the process liquid.

More particularly, it is an object of this invention to provide a transmitter of the above type constituted by high and low pressure sensors which are insensitive to changes in temperature and are hydraulically coupled by extended lines to a force-balance transducer or meter, whereby the meter is exposed to the normal temperature of the atmosphere and is unaffected by the temperature of the liquid being sensed.

Also an object of the invention is to provide high and low pressure sensors hydraulically coupled to a force balance meter, each sensor including a hydraulic fill chamber whose physical dimensions are varied as a function of temperature to alter the internal volume of the chamber in proportion to changes in fill pressure occurring by reason of changes in fill temperature, thereby rendering the sensor insensitive to temperature variations.

Briefly stated, in a differential pressure transmitter in accordance with the invention, the high and low pressure sensors are coupled to the force beam of the force balance meter so that the beam is responsive to the difference between the sensed high and low pressures derived from the process variable, each sensor being constituted by a housing having a well therein covered by a sensing diaphragm and an insert seated in the well, the face of the insert being spaced from the diaphragm to define a fill chamber containing hydraulic fluid, the fill chamber being hydraulically coupled to an extended capillary tube to the force-balance meter.

The insert is formed of a metal having a coefficient of expansion that is low relative to the material of the housing, whereby variations in temperature produce changes in the dimensions of the housing relative to that of the insert and result in changes of the volume of the fill chamber to an extent compensating for the concurrent changes in the volume of the hydraulic fluid, thereby rendering the sensor independent of variations in temperature.

In practice, the low and high pressure sensors may be coupled at different elevations to a tank whose liquid level is to be measured. Or the sensors may be coupled to the low and high pressure outputs of an orifice plate installed in a flow line to measure the flow rate of fluid in this line.

OUTLINE OF DRAWING

Figure 2:
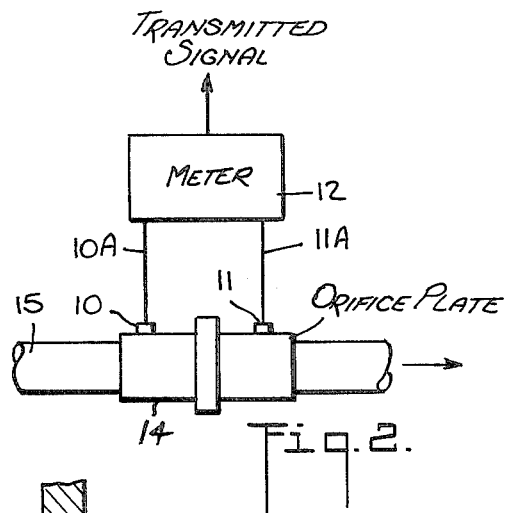
Figure 3:
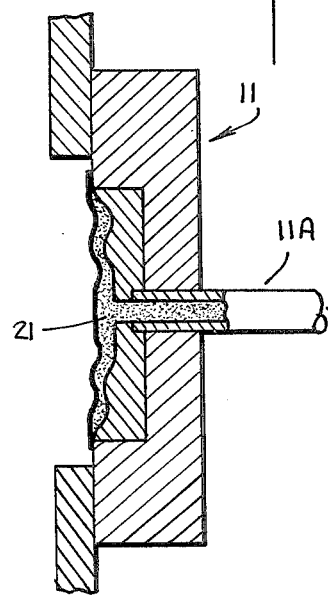
Figure 3:
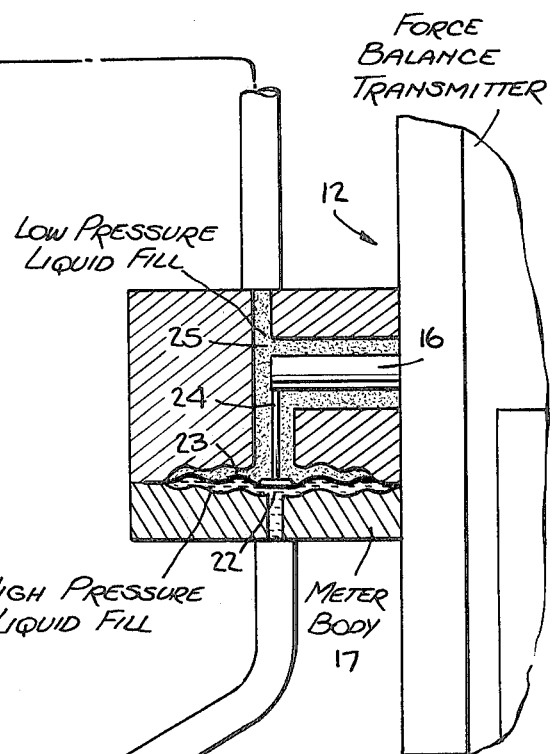
Figure 3:
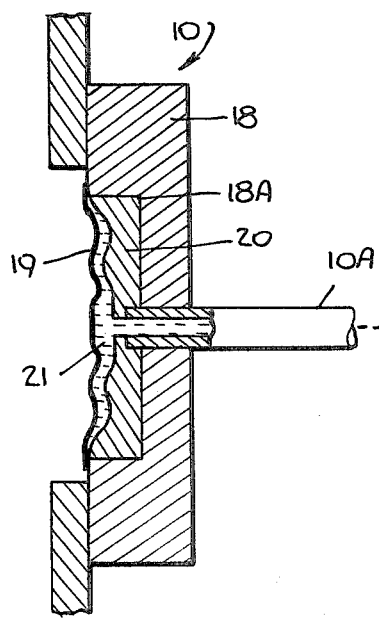
Figure 3:
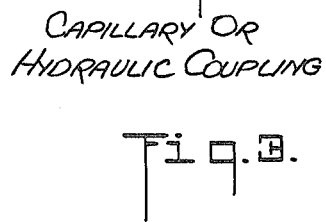

For a better understanding of the invention as well as other objects and further features thereof, reference is made to the following detailed description to be read in conjunction with the accompanying drawings, wherein:

FIG. 1 schematically shows a differential pressure transmitter in accordance with the invention, the transmitter functioning to measure the level of water in a tank;

FIG. 2 schematically shows the same transmitter operating to measure the flow rate of fluid in a pipe line; and FIG. 3 is a sectional view of the components of the transmitter.

DESCRIPTION OF INVENTION

As shown in FIGS. 1 and 2, a differential-pressure transmitter in accordance with the invention for producing an output signal proportional to a process variable is constituted by a high-pressure sensor 10, a low-pressure sensor 11 identical to the high-pressure sensor, and a force-balance transducer or meter 12 coupled to these sensors by means of extended capillary tubes 10A and 11A.

In the arrangement shown in FIG. 1, the sensors are coupled at different heights to a water tank 13 so that the transmitter then functions to measure the water level therein and to provide a signal indicative thereof. In the arrangement shown in FIG. 2, the sensors are coupled to the high and low pressure ports of an orifice plate 14 in a fluid flow line 15, the transmitter in this instance acting to produce a signal proportional to flow rate.

The particular use to which the present invention is put is not significant, except that regardless of the process variable which is being measured, the fluid to which the sensors are coupled is either very hot or very cold and not necessarily at the same temperature, so that the effect of temperature on the sensors must be taken into account. With the differential-pressure transmitter arrangement shown, it will be seen that meter 12 is remote from the liquid in the tank or in the flow line, hence the meter itself is exposed to ambient atmospheric temperature and is not affected by the markedly different temperaature of the fluid. In practice, the capillary tubes may be formed of flexible metal tubing and run as long as 15 feet or more.

Referring now to FIG. 3, the force balance transducer or meter, generally designated by numeral 12, includes a pivoted force beam 16 supported within a meter body 17.

High-pressure sensor 10, which is mounted on the wall of a tank whose liquid level is to be metered or on an orifice plate as previously described, includes a housing 18 which is bolted or otherwise secured to the wall or plate to cover an opening therein. Overlying a circular well 18A formed in housing 18 is a sensing diaphragm 19 whose periphery is welded or otherwise attached to the bank surrounding the well, the face of the diaphragm being directly in contact with the liquid to be measured and being exposed to the temperature thereof. Thus the housing and the diaphragm of the sensor are in heat transfer relation with the process liquid and are heated or cooled thereby, depending on the liquid temperature.

Seated within the well is an insert 20 whose face has corrugations formed thereon which conform to the corrugations of the diaphragm, the face of the insert being spaced from the diaphragm to define a fill chamber 21. The hydraulic fluid in this chamber is in direct contact with the sensing diaphragm and the housing insert, hence the heat of the diaphragm and insert is transferred to this fluid.

Extending between high-pressure sensor 10 and meter 17 is capillary tube 10A, this tube communicating between the sensor fill chamber 21 and a high-pressure chamber 22 formed in the meter body, this chamber being provided with a force-measuring diaphragm 23. The force-measuring diaphragm is mechanically linked by a pin 24 to the lower extremity of force beam 16.

Force beam 16 operates in a low-pressure liquid fill chamber 25 which communicates through capillary tube 11A to fill chamber 21 in a low-pressure sensor 11. The construction of low-pressure sensor 11 is identical to that of sensor 10 and includes a housing 18 having a well 18A therein which is covered by a diaphragm 19, an insert 20 being seated within the well to define in conjunction with diaphragm 19, the fill chamber 21.

Thus the force imposed on one face of force-measuring diaphragm 23 in the body of the meter is the relatively high-pressure detected by high-pressure sensor 10, while the force imposed on the opposite face of force-measuring diaphragm 23 is the low-pressure detected by low-pressure sensor 11. The resultant deflection of the force-measuring diaphragm represents the difference between the sensed low and high pressure and acts on the force beam to deflect the beam accordingly. The remaining elements of the force balance meter, such as the feedback bellows, are illustrated and described in the above-identified copending application and are therefore omitted in the present application.

The sensors are rendered insensitive to the effect of temperature on the volume of fluid in the fill chamber 21. For this purpose insert 20, which is seated in housing 18 is preferably formed of a metal such as INVAR (an iron-nickel alloy), having a very low thermal coefficient of expansion, whereas the material of the housing, which is preferably stainless steel, has a much higher coefficient of expansion. The dimensions of the housing and of the insert are such that, taken in conjunction with their dissimilar coefficients of expansion, the internal volume of fill chamber 21 will increase or decrease in direct proportion to the expansion or contraction of the volume of hydraulic fluid contained in the fill chamber, thereby compensating for the effect of temperature on the volume of fill.

The coefficient of expansion of INVAR, the preferred material for the insert, is less than $1.0 \times 10^{-6}$ in/in/°F, whereas that of stainless steel, the preferred material for the housing, is greater than $9.0 \times 10^{-6}$ in/in/F°. It will be appreciated that other dissimilar material combinations and dimensions may be used for the same purpose.

Thus the sensors 10 and 11, which are subject to the temperature of the process liquid, nevertheless produce a hydraulic force which is proportional to the pressure applied by the fluid and is independent of temperature, so that the meter which is responsive to the difference between the hydraulic forces produced by the sensors generates an output signal accurately proportional to the process variable.

While there have been shown and described preferred embodiments of a differential pressure transmitter in accordance with the invention, it will be appreciated that many changes and modifications may be made therein without, however, departing from the essential spirit thereof. Thus while the transmitter has been described as adapted to measure the level of liquid in a tank or flow rate in a pipe line, it may be used to measure other variables such as the density and specific gravity of a liquid which is very hot or cold.

I claim:
1. A transmitter for generating a signal proportional to a process variable in an application involving a fluid whose temperature is markedly at variance with ambient temperature, the fluid being contained or flowing through a structure having a wall, said transmitter comprising:
   A. a force-balance meter having a pivoted force beam to produce an output signal depending on the force applied to said beam to deflect same, said meter being provided with a body having a high-pressure hydraulic fluid chamber covered by a force-measuring diaphragm mechanically linked within a low-pressure hydraulic fluid chamber to the lower end of the force beam;
   B. a low-pressure and a high-pressure sensor, each having a housing attachable to said wall, said housing having a well therein covered by a sensing diaphragm whose face is exposed to the fluid through an opening in said wall, and an insert seated in said well, the face of said insert being spaced from the sensing diaphragm to define a fill chamber containing hydraulic fluid, the temperature of said hydraulic fluid being subject to the temperature of said process variable;
   C. an extended capillary tube hydraulically coupling the fill chamber of each sensor to said meter, said high-pressure chamber being coupled to the capillary tube leading to the high-pressure sensor, said low-pressure chamber being coupled to the capillary tube leading to the low-pressure sensor, whereby the respective forces produced by the pressures of the process variable on the sensing diaphragms of the low and high pressure sensors are applied differentially to said beam to deflect same, said insert being formed of a metal having a coefficient of expansion that is low relative to the material of said housing, whereby variations in temperature produce changes in the dimension of the housing relative to that of the insert and result in changes in the volume of said fill chamber to an extent compensating for concurrent changes in the volume of the hydraulic fluid resulting from changes in the temperature thereof, thereby rendering the force applied to said beam by each sensor independent of said variations in temperature.

2. A transmitter as set forth in claim 1, wherein said insert is formed of an iron-nickel alloy.

3. A transmitter as set forth in claim 1, wherein said housing is formed of stainless steel.

4. A transmitter as set forth in claim 1, wherein said force balance transducer produces a pneumatic signal that is a function of the process variable.

* * * * *